(12) United States Patent
Tokumitsu et al.

(10) Patent No.: US 10,045,033 B2
(45) Date of Patent: Aug. 7, 2018

(54) VIDEO CODING DEVICE, VIDEO CODING METHOD, AND VIDEO CODING PROGRAM

(71) Applicant: NEC Corporation, Minato-ku, Tokyo (JP)

(72) Inventors: Kenta Tokumitsu, Tokyo (JP); Keiichi Chono, Tokyo (JP); Eita Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 14/888,976

(22) PCT Filed: Apr. 22, 2014

(86) PCT No.: PCT/JP2014/002252
§ 371 (c)(1),
(2) Date: Nov. 4, 2015

(87) PCT Pub. No.: WO2014/199551
PCT Pub. Date: Dec. 18, 2014

(65) Prior Publication Data
US 2016/0119630 A1  Apr. 28, 2016

(30) Foreign Application Priority Data
Jun. 11, 2013 (JP) .................................. 2013-122400

(51) Int. Cl.
H04N 19/18 (2014.01)
H04N 19/70 (2014.01)
(Continued)

(52) U.S. Cl.
CPC ........... *H04N 19/18* (2014.11); *H04N 19/124* (2014.11); *H04N 19/14* (2014.11); *H04N 19/146* (2014.11);
(Continued)

(58) Field of Classification Search
None
See application file for complete search history.

(56) References Cited

U.S. PATENT DOCUMENTS

| 2012/0262313 | A1* | 10/2012 | He | H03M 7/30 341/87 |
| 2012/0263238 | A1* | 10/2012 | Miyoshi | H04N 19/176 375/240.16 |

FOREIGN PATENT DOCUMENTS

| JP | 2010-087771 A | 4/2010 |
| JP | 2011-509642 A | 3/2011 |
| WO | 2012/075193 A1 | 6/2012 |

OTHER PUBLICATIONS

"A High Throughput CAVLC Design for HEVC", Chen et al., 2012 IEEE International Symposium on Circuits and Systems (ISCAS), May 20-23, 2012 (Year: 2012).*

(Continued)

*Primary Examiner* — Janese Duley

(57) ABSTRACT

A quantization unit for quantizing orthogonal transform coefficients to calculate a coefficient level: calculates the number of value information bits of a significant coefficient level of an orthogonal transform coefficient to be processed in an image block; monitors coefficient levels output from the quantization unit in the image block from beginning to the N-th prior to the target in transmission order, and updates a state variable indicating whether or not at least one of monitored coefficient levels is significant; calculates the number of position information bits of the significant coefficient level of the orthogonal transform coefficient to be processed, based on a position of the orthogonal transform coefficient to be processed and the state variable; and sets the significant coefficient level to 0 in the case where the number of value information bits and the number of position information bits satisfy a predetermined condition.

6 Claims, 14 Drawing Sheets

(51) Int. Cl.
H04N 19/96 (2014.01)
H04N 19/124 (2014.01)
H04N 19/91 (2014.01)
H04N 19/14 (2014.01)
H04N 19/146 (2014.01)
H04N 19/147 (2014.01)
H04N 19/64 (2014.01)

(52) U.S. Cl.
CPC ............ *H04N 19/70* (2014.11); *H04N 19/91* (2014.11); *H04N 19/96* (2014.11); *H04N 19/147* (2014.11); *H04N 19/647* (2014.11)

(56) References Cited

OTHER PUBLICATIONS

Benjamin Bross et al.,"High Efficiency Video Coding(HEVC) text specification draft 10( for FDIS & Last Call)", JCT-VC-L1003_v34, Joint collaborative Team on Video Coding, 12th Meeting, Geneva, CH, Jan. 14-23, 2013.

Kenta Tokumitsu, Seiya Shibata, Keiichi Chono., "Entropy Constrained Quantization for Low-Bitrate HEVC Encoding", (D-11-46), Proceedings 2 of the IEICE General conference, Joho systems 2, Mar. 2013. p. 46, D-11-46.

International Search Report for PCT Application No. PCT/JP2014/002252, dated Jul. 29, 2014.

Farag I. Y. Elnagahy et al., "Wavelet-based embedded rate scalable still image coders: a review", Czech Technical University in Prague, Acta Polytechnica, vol. 44, No. 1, Jan. 2004, pp. 3-17.

R. L. Lagendijk et al., "Low-complexity rate-distortion optimal transcoding of MPEG I-frames", Signal Processing, Image Communication 15 (2000), Elsevier Science Publishers, Amsterdam, NL, vol. 15, No. 6, Mar. 2000, pp. 531-544.

Michael Lavrentiev et al., "Transrating of MPEG-2 coded video via requantization with optimal trellis-based DCT coefficients modification", Electrical Engineering Department Technion—Israel Institute of Technology, 2004 12th European Signal Processing Conference, IEEE, Sep. 6, 2004, pp. 1963-1966.

Jerome M. Shapiro, "Embedded Image Coding Using Zerotrees of Wavelet Coefficients", IEEE Transactions on Signal Processing, IEEE Service Center, New York, NY, USA, vol. 41, No. 12, Dec. 1993, pp. 3445-3462.

Extended European Search Report for EP Application No. EP14810729.5 dated on Oct. 14, 2016.

\* cited by examiner

VIDEO CODING DEVICE, VIDEO CODING METHOD, AND VIDEO CODING PROGRAM

This application is a National Stage Entry of PCT/JP2014/002252 filed on Apr. 22, 2014, which claims priority from Japanese Patent Application 2013-122400 filed on Jun. 11, 2013, the contents of all of which are incorporated herein by reference, in their entirety.

TECHNICAL FIELD

The present invention relates to a technique of simultaneously quantizing orthogonal transform coefficients successive in transmission order.

BACKGROUND ART

In the video coding scheme based on the method described in Non Patent Literature (NPL) 1, each frame of digitized video is split into coding tree units (CTUs), and each CTU is coded in raster scan order. Each CTU is split into coding units (CUs) and coded, in a quadtree structure. Each CU is split into prediction units (PUs) and predicted. The prediction error of each CU is split into transform units (TUs) in a quadtree structure and frequency-transformed.

A CU is a unit of coding in intra prediction/inter-frame prediction. Intra prediction and inter-frame prediction will be described below.

Intra prediction is prediction from a reconstructed image of a frame to be coded. NPL 1 defines, for example, 33 types of angular intra prediction depicted in FIG. 9. In angular intra prediction, a reconstructed pixel near a block to be coded is used for extrapolation in any of 33 directions depicted in FIG. 9, to generate an intra prediction signal. A CU using intra prediction is hereafter referred to as intra CU.

Inter-frame prediction is prediction based on an image of a reconstructed frame (reference picture) different in display time from a frame to be coded. Inter-frame prediction is hereafter also referred to as inter prediction. FIG. 10 is an explanatory diagram showing an example of inter-frame prediction. A motion vector $MV=(mv_x, mv_y)$ indicates the amount of translation of a reconstructed image block of a reference picture relative to a block to be coded. In inter prediction, an inter prediction signal is generated based on a reconstructed image block of a reference picture (using pixel interpolation if necessary). A CU using inter prediction is hereafter referred to as inter CU.

A frame coded including only intra CUs is called I frame (or I picture). A frame coded including not only intra CUs but also inter CUs is called P frame (or P picture). A frame coded including inter CUs that each use not only one reference picture but two reference pictures simultaneously for the inter prediction of the block is called B frame (or B picture).

Next, Referring next to FIG. 11, the configuration and operation of a typical video coding device that receives each CU of each frame of digitized video as an input image and outputs a bitstream will be described.

A video coding device depicted in FIG. 11 includes a transformer 101, a quantizer 1020, an entropy encoder 103, an inverse transformer/inverse quantizer 104, a buffer 105, a predictor 106, and an estimator 107.

FIG. 12 is an explanatory diagram showing an example of CTU partitioning of the t-th frame and an example of CU partitioning of the eighth CTU (CTU8), in the case where the spatial resolution of the frame is the CIF (common intermediate format) and the CTU size is 64. FIG. 13 is an explanatory diagram showing a quadtree structure corresponding to the example of CU partitioning of CTU8.

FIG. 14 is an explanatory diagram showing examples of TU partitioning of a CU. An example of TU partitioning of a CU for an intra prediction 2N×2N PU is depicted in the upper part. In the case where the CU is intra predicted, the root of the quadtree is located in the PU, and the prediction error is expressed by the quadtree structure. An example of TU partitioning of a CU for inter prediction 2N×N PUs is depicted in the lower part. In the case where the CU is inter predicted, the root of the quadtree is located in the CU, and the prediction error is expressed by the quadtree structure.

The estimator 107 determines a CU quadtree structure, a PU partitioning shape, and a TU quadtree structure for each CTU.

The predictor 106 generates a prediction signal corresponding to the input image signal of the CU based on the CU quadtree structure and PU partitioning shape determined by the estimator 107. The prediction signal is generated based on the above-mentioned intra prediction or inter prediction.

The transformer 101 frequency-transforms a prediction error image obtained by subtracting the prediction signal from the input image signal based on the TU quadtree structure determined by the estimator 107.

The quantizer 1020 quantizes the frequency-transformed prediction error image (orthogonal transform coefficient). The quantized orthogonal transform coefficient is hereafter referred to as a coefficient level. A coefficient level having a value other than 0 is referred to as a significant coefficient level. As depicted in FIG. 15, the quantizer 1020 includes a coefficient level calculation unit 1201 that receives an orthogonal transform coefficient Kij and a quantization parameter QP and outputs a coefficient level Lij.

The entropy encoder 103 entropy-encodes cu_split_flag indicating the quadtree structure of the CTU, the prediction parameter, and the coefficient level.

The inverse transformer/inverse quantizer 104 inverse-quantizes the coefficient level. The inverse transformer/inverse quantizer 104 further inversely frequency-transforms the orthogonal transform coefficient obtained by the inverse quantization. The prediction signal is added to the reconstructed prediction error image obtained by the inverse frequency transform, and the result is supplied to the buffer 105. The buffer 105 stores the reconstructed image.

The typical video coding device generates a bitstream based on the operation described above.

FIG. 16 is an explanatory diagram showing an example of quantizing Kij using Qs having the value 4096 and a parameter f having the value ⅓. The operation of the quantizer 1020 and the entropy encoder 103 will be described below in further detail by using an example of 4×4 TU depicted in FIG. 16.

First, each orthogonal transform coefficient Kij and coefficient level Lij in the 4×4 TU are defined as follows.

Let Kij ($0 \leq i, j \leq 3$) be the value of orthogonal transform coefficient in a horizontal position i and a vertical position j on a frequency axis. Likewise, let the coefficient level Lij be the value of coefficient level corresponding to the orthogonal transform coefficient Kij. Note that Kij and Lij become higher frequency components as the values of i and j are larger.

Quantization is described in detail next. The coefficient level calculation unit 1201 calculates the coefficient level Lij by dividing Kij by the quantization step Qs. The coefficient level Lij is represented by the following Equation (1).

$$Lij = \text{Sign}(Kij) \cdot \text{Floor}(|Kij|/Qs+f) \quad (1)$$

Here, Sign(a) is a function that returns the positive or negative sign of an input a, Floor(a) is a function that returns the largest integer less than or equal to the input a, and f is a parameter (0≤f≤0.5) for determining quantization characteristics. The value of f is ⅙ in inter prediction, and ⅓ in intra prediction.

Qs is represented by the following Equation (2) using the quantization parameter QP.

$$Qs = 2^{7+\frac{QP}{6}-\log_2(N)-\frac{2}{3}} \quad (2)$$

Here, N is the block size of the TU. Regarding the 4×4 TU depicted in FIG. 16, N=4. FIG. 16 depicts an example of quantizing Kij using Qs having the value 4096 and f having the value ⅓.

Then, entropy encoding will be described in detail. First, position information and value information used in the description of entropy encoding for coefficient levels are defined.

In this specification, the position information is information indicating the positions of all significant coefficient levels included in the TU.

Referring to 7.4.9.11 in NPL 1, position information in HEVC (High Efficiency Video Coding) is composed of information last_significant_x and last_significant_y indicating the horizontal position and the vertical position of a significant coefficient level to be first transmitted, and information siginificant_coeff_flag indicative of the presence or absence of a significant coefficient level in each of positions from a position subsequent to (last_significant_x, last_significant_y) up to (0, 0). Therefore, the number of position information bits is the sum of the number of last_significant_x bits, the number of last_significant_y bits, and the number of siginificant_coeff_flag bits determined based on the position of the significant coefficient level to be first transmitted.

In this specification, the value information is information indicative of the value of a significant coefficient level.

Referring to 7.4.9.11 in NPL 1, the value information in HEVC is composed of information coeff_abs_level_greater1_flag indicating whether the absolute value of a significant coefficient level is larger than 1, information coeff_abs_level_greater2_flag indicating whether the absolute value of the significant coefficient level is larger than 2, information coeff_sign_flag indicative of the positive or negative sign of the significant coefficient level, and information coeff_abs_level_remaining indicative of the absolute value of a value (remaining significant coefficient level) obtained by subtracting coeff_abs_level_greater1_flag and coeff_abs_level_greater2_flag from the absolute value of the significant coefficient level larger than coeff_abs_level_greater1_flag and coeff_abs_level_greater2_flag. Therefore, the number of value information bits is the sum of the number of coeff_abs_level_greater1_flag bits, the number of coeff_abs_level_greater2_flag bits, the number of coeff_sign_flag bits, and the number of coeff_abs_level_remaining bits of the significant coefficient level.

Table 1 shows the relationship between the position information and value information and the coefficient level Lij. In Table 1, the items in the vertical items with respect to the horizontal ones are information of each Lij in the 4×4 TU depicted in FIG. 16.

TABLE 1

| | | COEFFICIENT LEVEL Lij | | | | | | | |
|---|---|---|---|---|---|---|---|---|---|
| | SYNTAX | $L_{33}=0$ | $L_{32}=0$ | $L_{23}=0$ | $L_{31}=0$ | $L_{22}=0$ | $L_{13}=0$ | $L_{30}=1$ | $L_{21}=0$ |
| POSITION INFORMATION | last_siginificant_x | — | — | — | — | — | — | 3 | — |
| | last_siginificant_y | — | — | — | — | — | — | 0 | — |
| | siginificant_coeff_flag | — | — | — | — | — | — | — | 0 |
| VALUE INFORMATION | coeff_abs_level_greater1_flag | — | — | — | — | — | — | 0 | — |
| | coeff_abs_level_greater2_flag | — | — | — | — | — | — | — | — |
| | coeff_sign_flag | — | — | — | — | — | — | 0 | — |
| | coeff_abs_level_remaining | — | — | — | — | — | — | — | — |

| | | COEFFICIENT LEVEL Lij | | | | | | | |
|---|---|---|---|---|---|---|---|---|---|
| | SYNTAX | $L_{12}=0$ | $L_{03}=0$ | $L_{20}=0$ | $L_{11}=0$ | $L_{02}=0$ | $L_{10}=0$ | $L_{01}=1$ | $L_{00}=0$ |
| POSITION INFORMATION | last_siginificant_x | — | — | — | — | — | — | — | — |
| | last_siginificant_y | — | — | — | — | — | — | — | — |
| | siginificant_coeff_flag | 0 | 0 | 0 | 0 | 0 | 0 | 1 | 0 |
| VALUE INFORMATION | coeff_abs_level_greater1_flag | — | — | — | — | — | — | 0 | — |
| | coeff_abs_level_greater2_flag | — | — | — | — | — | — | — | — |
| | coeff_sign_flag | — | — | — | — | — | — | 0 | — |
| | coeff_abs_level_remaining | — | — | — | — | — | — | — | — |

In Table 1, the last_significant_x and the last_significant_y indicate a position (i, j)=(3, 0) of a significant coefficient level $L_{30}=1$ to be first transmitted. The siginificant_coeff_flag indicates the presence or absence of a significant coefficient level in each of positions from a position subsequent to (3, 0) up to (0, 0). In the case of a significant coefficient level, siginificant_coeff_flag=1, while in the case of an insignificant coefficient level, siginificant_coeff_flag=0. In Table 1, $L_{30}=1$ and $L_{01}=1$ are represented by coeff_abs_level_greater1_flag=0 and coeff_sign_flag=0 (positive), respectively. Since both values are smaller than 2, coeff_abs_level_greater2_flag and coeff_abs_level_remaining are not used.

Table 2 indicates the relationship between the position information and value information and the number of bits of value information. In Table 2, the vertical items relative to the horizontal ones indicate the number of position information bits and the number of value information bits in the 4×4 TU depicted in FIG. 16.

TABLE 2

| | | Bin string | | | | | | | | | |
|---|---|---|---|---|---|---|---|---|---|---|---|
| | SYNTAX | $L_{33}=0$ | $L_{32}=0$ | $L_{23}=0$ | $L_{31}=0$ | $L_{22}=0$ | $L_{13}=0$ | $L_{30}=1$ | $L_{21}=0$ | $L_{12}=0$ |
| POSITION INFORMATION | last_siginificant_x | — | — | — | — | — | — | 111 | — | — |
| | last_siginificant_y | — | — | — | — | — | — | 0 | — | — |
| | siginificant_coeff_flag | — | — | — | — | — | — | — | 0 | 0 |
| VALUE INFORMATION | coeff_abs_level_greater1_flag | — | — | — | — | — | — | 0 | — | — |
| | coeff_coeff_abs_level_greater2_flag | — | — | — | — | — | — | — | — | — |
| | coeff_sign_flag | — | — | — | — | — | — | 0 | — | — |
| | coeff_abs_level_remaining | — | — | — | — | — | — | — | — | — |

| | | Bin string | | | | | | | [bin | |
|---|---|---|---|---|---|---|---|---|---|---|
| | SYNTAX | $L_{03}=0$ | $L_{20}=0$ | $L_{11}=0$ | $L_{02}=0$ | $L_{10}=0$ | $L_{01}=1$ | $L_{00}=0$ | number] | |
| POSITION INFORMATION | last_siginificant_x | — | — | — | — | — | — | — | 3 | 13 |
| | last_siginificant_y | — | — | — | — | — | — | — | 1 | |
| | siginificant_coeff_flag | 0 | 0 | 0 | 0 | 0 | 1 | 0 | 9 | |
| VALUE INFORMATION | coeff_abs_level_greater1_flag | — | — | — | — | — | 0 | — | 2 | 4 |
| | coeff_abs_level_greater2_flag | — | — | — | — | — | — | — | 0 | |
| | coeff_sign_flag | — | — | — | — | — | 0 | — | 2 | |
| | coeff_abs_level_remaining | — | — | — | — | — | — | — | 0 | |
| | | | | | | | | total | 17 | |

The number of bits of each information in Table 2 is represented by a bin number. The term bin denotes one bit in an intermediate bit string before being transformed into a bitstream to be output by the entropy encoder 103.

In the case of the 4×4 TU depicted in FIG. 16, after transmitting 13 bin as bits of the position information on all significant coefficient levels in the TU, the entropy encoder 103 transmits the number of value information bits of respective significant coefficient levels, i.e., a total of 4 bin. The position information is composed of last_significant_x, last_significant_y, and siginificant_coeff_flag. The last_significant_x and the last_significant_y indicate (i, j)=(3, 0) as the position of a significant coefficient to be first transmitted, which is 4 bin. The siginificant_coeff_flag indicates the presence or absence of a significant coefficient level in each of nine positions from a position (2, 1) subsequent to the position of the significant coefficient to be first transmitted up to (0, 0), which is 9 bin.

The value information is composed of coeff_abs_level_greater1_flag, coeff_coeff_abs_level_greater2_flag, coeff_sign_flag, and coeff_abs_level_remaining. The coeff_abs_level_greater1_flag indicates whether $L_{30}$ and $L_{01}$ are larger than 1 respectively, which is 2 bin. The coeff_coeff_abs_level_greater2_flag is 0 bin because there exists no coefficient level with the absolute value of the significant coefficient level larger than 2. The coeff_sign_flag indicates the positive or negative signs of $L_{30}$ and $L_{01}$, which is 2 bin. The coeff_abs_level_remaining is 0 bin because there exists no coefficient level with the absolute value of the significant coefficient level larger than 2.

In the case of the 4×4 TU, the maximum bin number of each information is as follows: In other words, since the maximum value in the 4×4 TU is 3 (=N−1=4−1) based on the section 7.4.9.11 in NPL 1, the last_significant_x is up to 3 bin. Similarly, the last_significant_y is also up to 3 bin. The siginificant_coeff_flag is up to 15 bin because of up to 15 per 4×4 TU based on the section 7.3.8.11 in NPL 1. The coeff_abs_level_greater1_flag is up to 8 bin because of up to 8 per 4×4 TU based on the section 7.3.9.11 in NPL 1. The coeff_coeff_abs_level_greater2_flag is up to 1 bin because of up to 1 per 4×4 TU based on the section 7.3.8.11 in NPL 1.

The coeff_sign_flag is up to 16 bin because of up to 16 per 4×4 TU based on the section 7.3.8.11 in NPL 1. Based on the section 9.3.3.9 in NPL 1, bin for coeff_abs_level_remaining is calculated.

As apparent from Equations (9-13) and (9-14) in the section 9.2.2.8 of NPL 1, high-dimensional TU code is applied to a bin string of the prefix part of coeff_abs_level_remaining each time the value of a significant coefficient level last transmitted exceeds a predetermined threshold value, and high-dimensional Exp-Golom code is applied to a bin string of the suffix part of coeff_abs_level_remaining. In other words, the bin number for the suffix part of coeff_abs_level_remaining having a small value becomes large, while the bin number for the suffix part of coeff_abs_level_remaining having a large value becomes small.

CITATION LIST

Non Patent Literature

NPL 1: High efficiency video coding (HEVC) text specification draft 10, JCTVC-L1003_v34, Joint Collaborative Team on Video Coding (JCT-VC) of ITU-T SG16 WP3 and ISO/IEC JTC1/SC29/WG11 12th Meeting: Geneva, CH, 14-23 Jan. 2013.

NPL 2: Kenta Tokumitsu, et al. "Entropy Constrained Quantization for Low-Bitrate HEVC Encoding" (D-11-46), Proceedings 2 of the IEICE General Conference, Information and Systems, March 2013.

SUMMARY OF INVENTION

Technical Problem

The quantizer in the typical video coding device described above may generate a high-cost coefficient level. The high-cost coefficient level is a significant coefficient level for which a large number of bits are generated as a result of entropy encoding despite a lack of improvement in signal-noise ratio. A representative example is a significant coefficient level with a small value and a large number of bits of position information. The typical video coding device described above has a problem in that the transmission of the high-cost coefficient level output from the quantizer causes a decrease in compression efficiency.

As disclosed in NPL 2, the occurrence of the high-cost coefficient level can be suppressed by quantizing the orthogonal transform coefficient in consideration of the number of bits of value information and the number of bits of position information. However, the calculation of the number of bits of position information described in NPL 2 uses information of whether or not the quantizer has output a significant coefficient level for any orthogonal transform coefficient up to the immediately preceding orthogonal transform coefficient. Accordingly, in the case of suppressing the occurrence of the high-cost coefficient level using the number of bits of position information, a plurality of coefficient levels successive in transmission order cannot be determined simultaneously. In other words, parallel quantization cannot be performed. The video coding device incapable of parallel quantization needs to maintain its processing performance by raising the clock frequency, and so has a problem of an increase in power consumption.

It is thus impossible to achieve both prevention of a decrease in compression efficiency and parallel quantization.

The present invention has an object of providing a video coding device, video coding method, and video coding program that achieves both prevention of a decrease in compression efficiency and parallel quantization of a plurality of orthogonal transform coefficients by simultaneously determining a plurality of coefficient levels successive in transmission order in consideration of the numbers of bits of value information and position information.

Solution to Problem

A video coding device according to the present invention comprises: orthogonal transform means for orthogonally transforming an image block to calculate orthogonal transform coefficients; quantization means for quantizing the orthogonal transform coefficients to calculate a coefficient level; and entropy encoding means for entropy-encoding position information on all significant coefficient levels from among the coefficient levels and then entropy-encoding value information on each of the significant coefficient levels, to output a bitstream, wherein the quantization means includes: number of value information bits calculation means for calculating the number of value information bits of a significant coefficient level of an orthogonal transform coefficient to be processed in the image block; state variable update means for monitoring coefficient levels output from beginning to the N-th prior to the target in transmission order, and updating a state variable indicating whether or not at least one of monitored coefficient levels is significant; number of position information bits calculation means for calculating the number of position information bits of the significant coefficient level of the orthogonal transform coefficient to be processed, based on a position of the orthogonal transform coefficient to be processed and the state variable; and high-cost coefficient level detection/removal means for setting the significant coefficient level to 0 in the case where the number of value information bits and the number of position information bits satisfy a predetermined condition.

A video coding method according to the present invention comprises: orthogonally transforming an image block to calculate an orthogonal transform coefficient; quantizing the orthogonal transform coefficient to calculate a coefficient level; and entropy-encoding position information of all significant coefficient levels from among the coefficient levels and then entropy-encoding value information of each of the significant coefficient levels, to output a bitstream, wherein when calculating the coefficient levels, the number of value information bits of a significant coefficient level of an orthogonal transform coefficient to be processed in the image block is calculated; a state variable indicating whether at least one of coefficient levels in the image block from beginning to the N-th prior to the target in transmission order is significant or not is updated; the number of position information bits of the significant coefficient level of the orthogonal transform coefficient to be processed is calculated based on a position of the orthogonal transform coefficient to be processed and the state variable; and the significant coefficient level is set to 0 in the case where the number of value information bits and the number of position information bits satisfy a predetermined condition.

A video coding program according to the present invention causes a computer to execute: a process of orthogonally transforming an image block to calculate an orthogonal transform coefficient; a process of quantizing the orthogonal transform coefficient to calculate a coefficient level; and a process of entropy-encoding position information of all significant coefficient levels from among the coefficient levels and then entropy-encoding value information of each of the significant coefficient levels, to output a bitstream, wherein in the process to calculate the coefficient level, the computer is caused to execute: a process of calculating the number of value information bits of a significant coefficient level of an orthogonal transform coefficient to be processed in the image block; a process of updating a state variable indicating whether or not at least one of coefficient levels in the image block from beginning to the N-th prior to the target in transmission order is significant; a process of calculating the number of position information bits of the significant coefficient level of the orthogonal transform coefficient to be processed, based on a position of the orthogonal transform coefficient to be processed and the state variable; and a process of setting the significant coefficient level to 0 in the case where the number of value information bits and the number of position information bits satisfy a predetermined condition.

Advantageous Effects of Invention

According to the present invention, a video coding device that achieves both prevention of a decrease in compression efficiency and parallel quantization of a plurality of orthogonal transform coefficients can be realized.

DESCRIPTION OF EMBODIMENTS

In the following exemplary embodiments, the video coding device calculates the number of position information bits using information of whether or not the quantizer has output a significant coefficient level from beginning coefficient level to the coefficient level which is N-th (N≥2) prior to the target in transmission order, instead of using information of whether or not the quantizer has output a significant coefficient level until just before. Since the video coding device can calculate the number of bits of position information without using the immediately preceding (N−1) coefficient levels, parallel processing is enabled.

When the processing target changes, however, there is a possibility that the number of position information bits is wrongly estmated to be larger and as a result a coefficient level that is not a high-cost coefficient level will end up being removed. In view of this, attention is directed to the point that the probability of wrongly estimating the number ΔR of transmission bits to be larger is the product of the probability of the quantizer outputting always 0 from beginning of the TU to the N-th (N≥2) prior to the target and the probability of any one of the (N−1) coefficient levels immediately preceding the processing target being a significant coefficient level. Since the former probability is a direct product of values less than 1, the former probability becomes to be lower when the processing target is closer to the end in transmission order, i.e. when the frequency component of the coefficient level is lower in frequency. Moreover, given that the values of coefficient levels tend to be predominantly 0, the latter probability is low, too. Since the probability of wrongly estimating the number of position information bits to be larger is low, the probability of removing a coefficient level that is not a high-cost coefficient level is low.

The video coding device calculates the number of position information bits of each significant coefficient level using the coefficient levels output from the quantizer from beginning of the image block to the N-th prior to the target in transmission order, and also determines the coefficient level to be output as a result of quantization in consideration of the numbers of bits of position information and value information in addition to N successive provisional coefficient levels. The video coding device thus achieves both prevention of a decrease in compression efficiency and parallel quantization of a plurality of orthogonal transform coefficients.

Exemplary Embodiment 1

Figure 1:
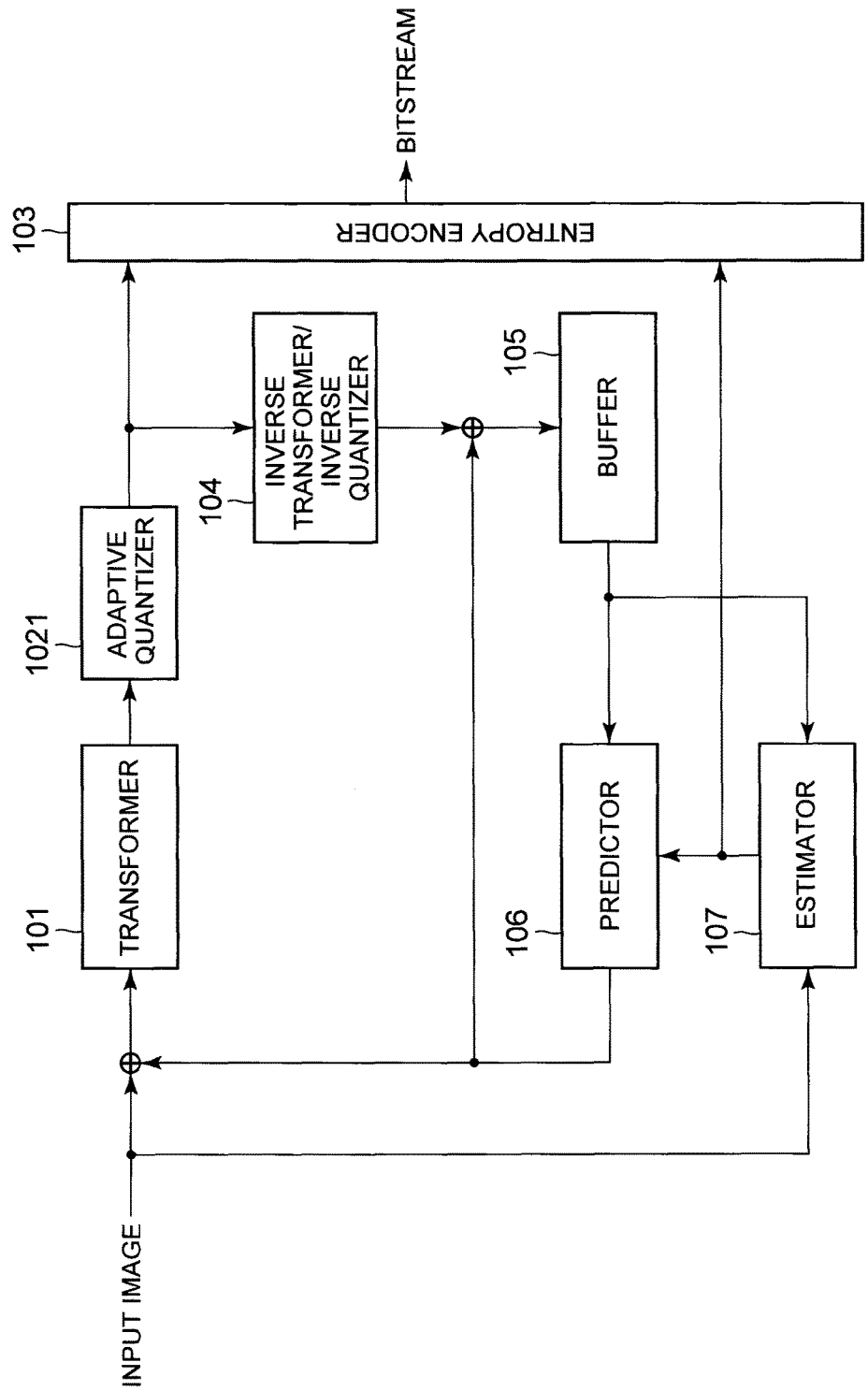
FIG. 1 It is a block diagram showing Exemplary Embodiment 1 of a video coding device according to the present invention.

FIG. 1 is a block diagram showing Exemplary Embodiment 1 of a video coding device according to the present invention. Referring to FIG. 1, the configuration of the first exemplary embodiment of the video coding device that receives each frame of digitized video as an input image and outputs a bitstream will be described.

The video coding device in Exemplary Embodiment 1 regards each coefficient level for which the number of position information bits is greater than the number of value information bits as a high-cost coefficient level, and simultaneously quantizes N successive orthogonal transform coefficients. The video coding device simultaneously determines a plurality of coefficient levels successive in transmission order in consideration of the number of value information bits and the number of position information bits, thus achieving both prevention of a decrease in compression efficiency and parallel quantization of a plurality of orthogonal transform coefficients.

Figure 11:
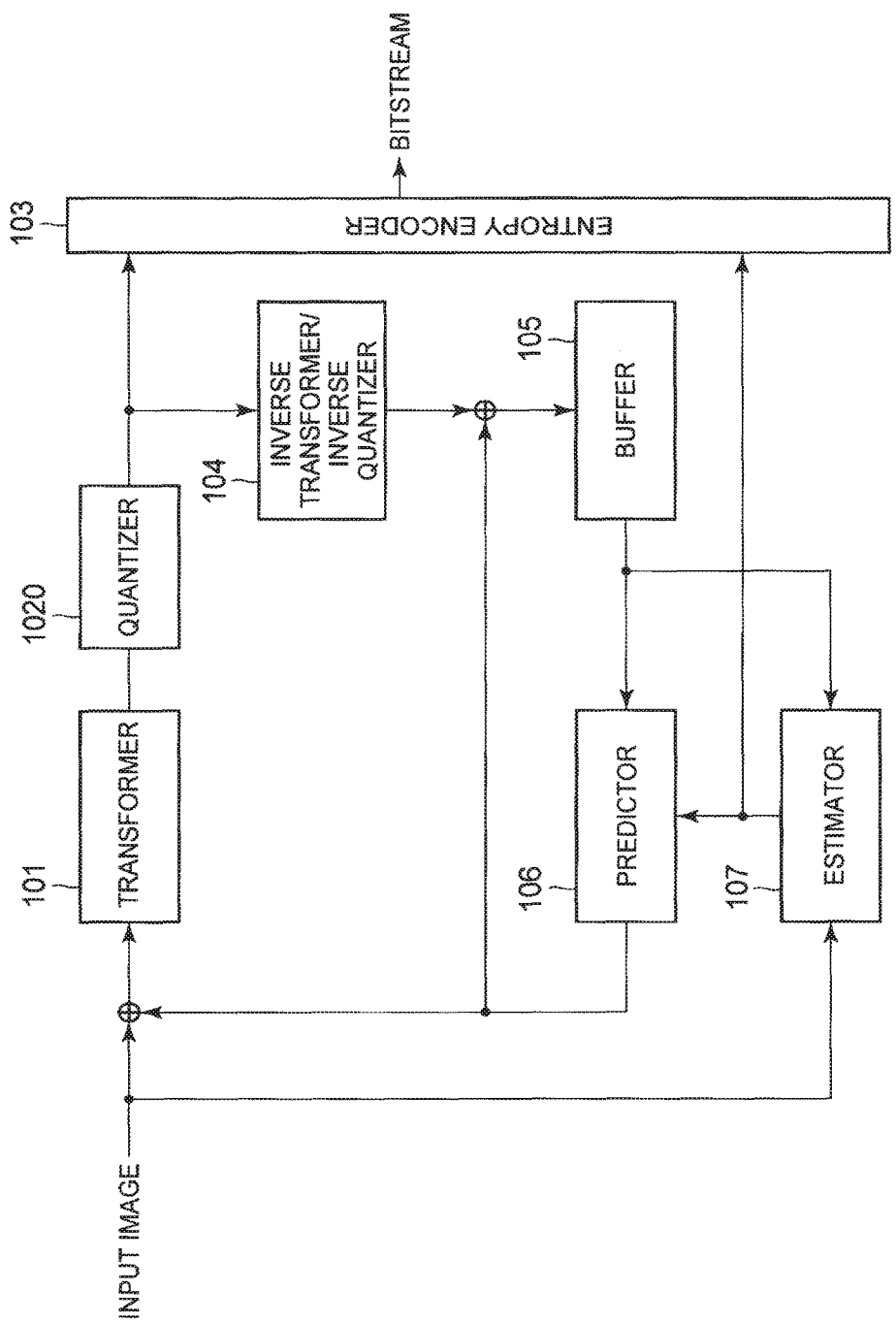
FIG. 11 It is an explanatory diagram showing the structure of a typical video coding device.
Figure 12:
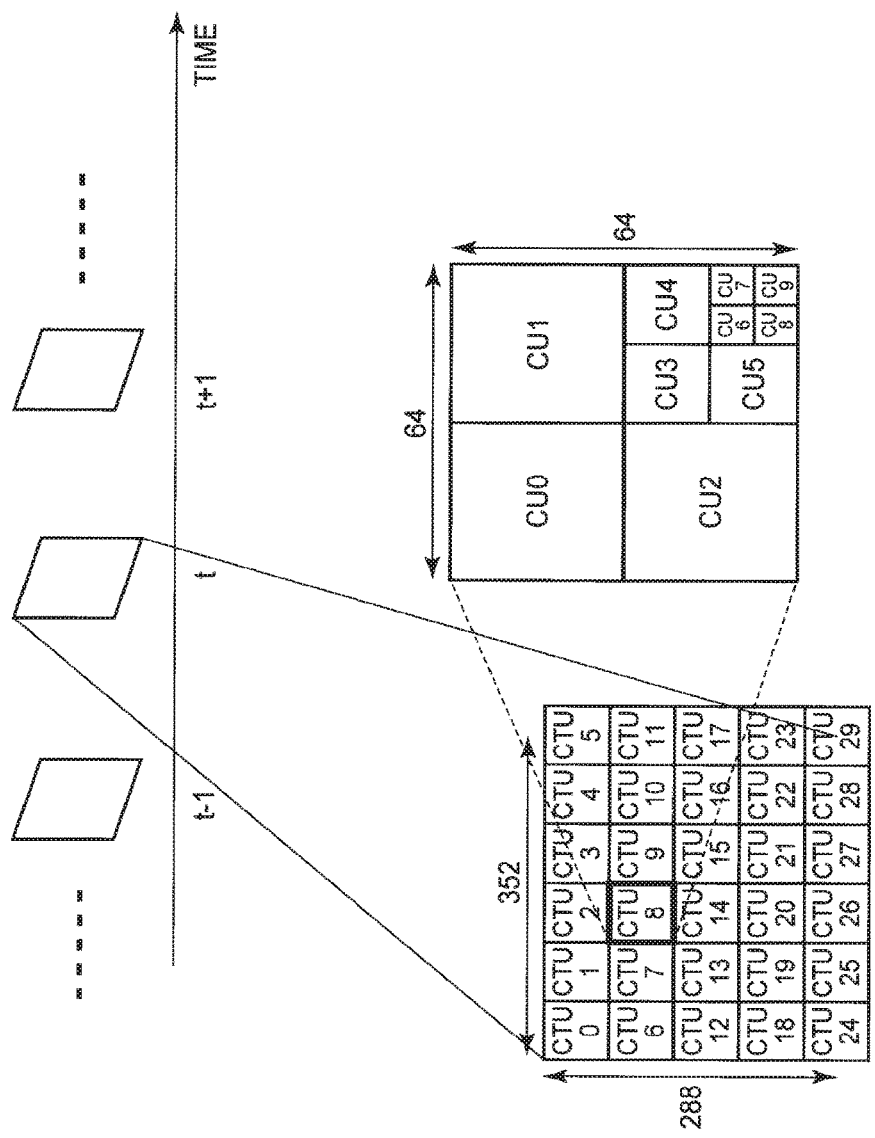
FIG. 12 It is an explanatory diagram showing an example of CTU partitioning of frame t and an example of CU partitioning of CTU8 of frame t.
Figure 13:
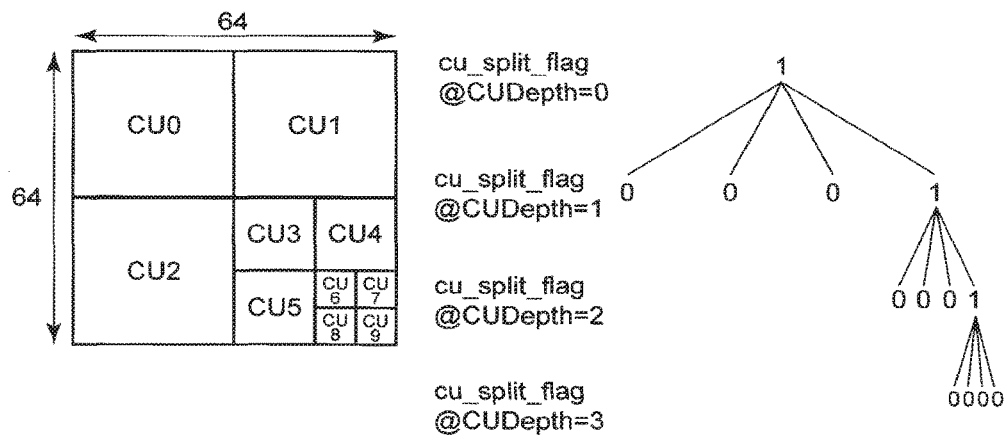
FIG. 13 It is an explanatory diagram showing a quadtree structure corresponding to the example of CU partitioning of CTU8.
Figure 14:
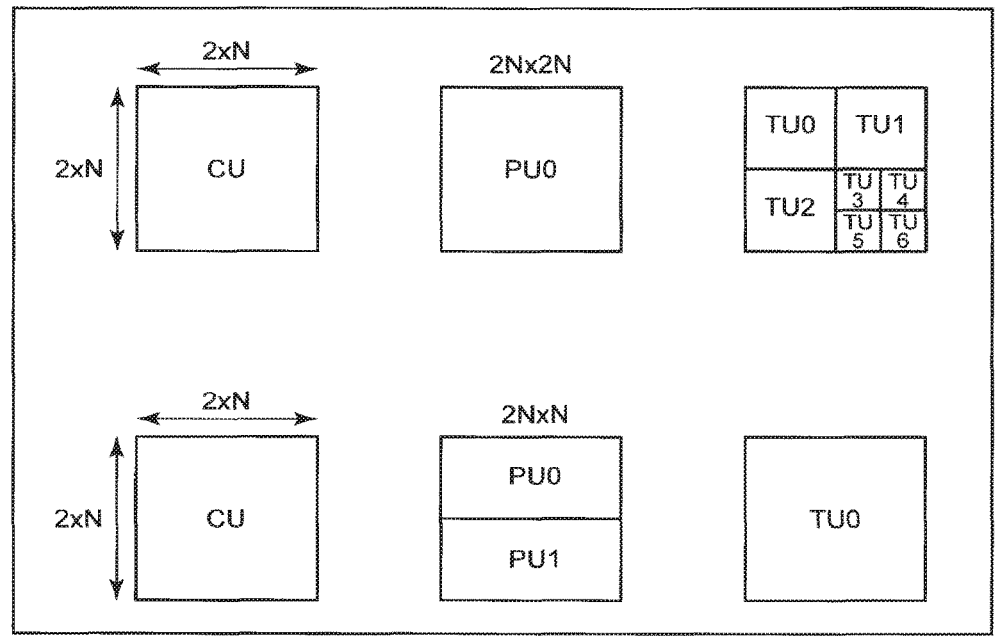
FIG. 14 It is an explanatory diagram showing examples of TU partitioning of a CU.

The video coding device depicted in FIG. 1 includes the transformer 101, an adaptive quantizer 1021, the entropy encoder 103, the inverse transformer/inverse quantizer 104, the buffer 105, the predictor 106, and the estimator 107. As compared with the video coding device depicted in FIG. 11, the adaptive quantizer 1021 is included instead of the quantizer 1020. The other blocks in the video coding device depicted in FIG. 1 are the same as the blocks in the video coding device depicted in FIG. 11, and so only the adaptive quantizer 1021 is described below.

Figure 2:
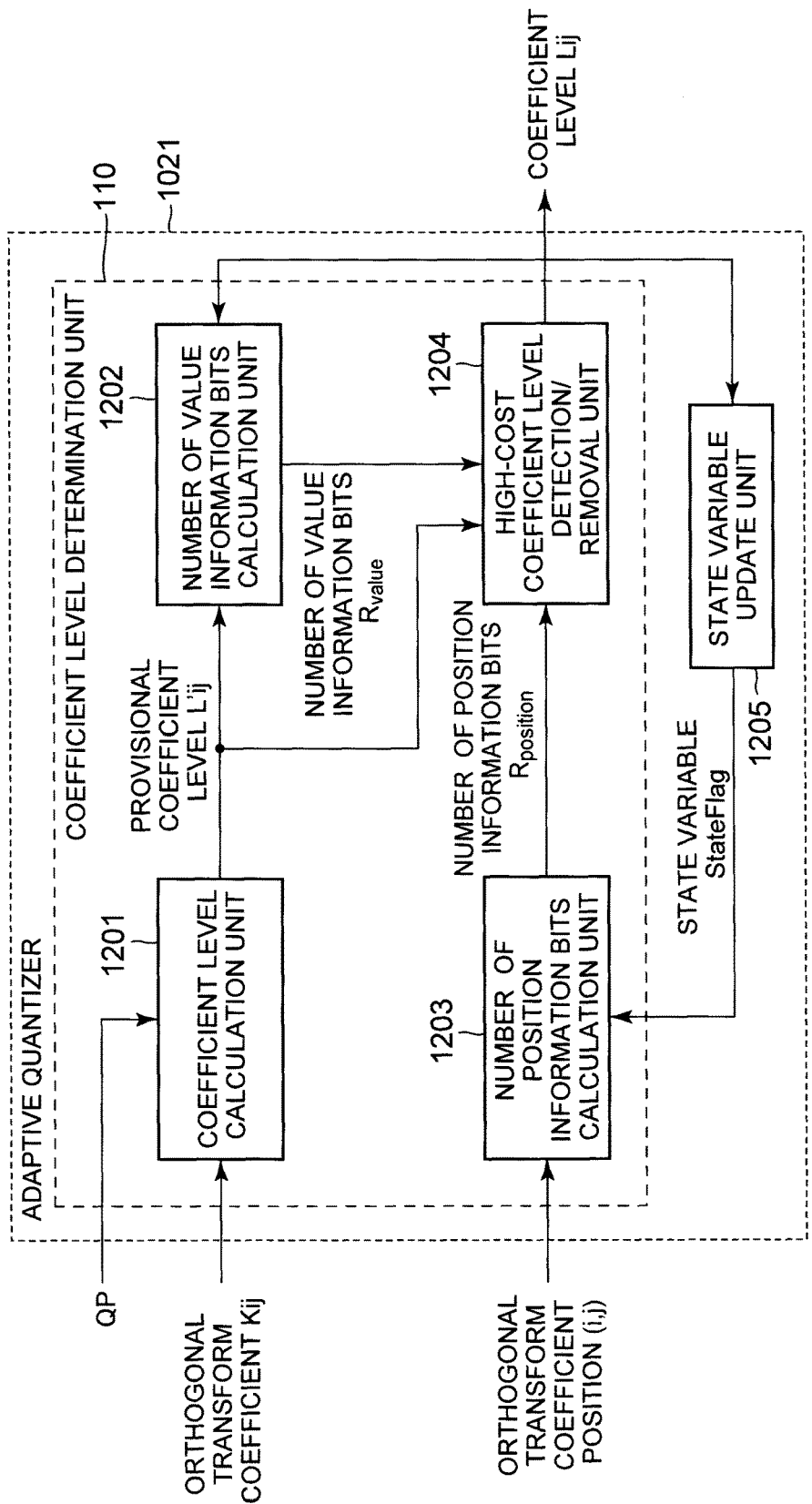
FIG. 2 It is a block diagram showing the structure of an adaptive quantizer in Exemplary Embodiment 1.
Figure 15:
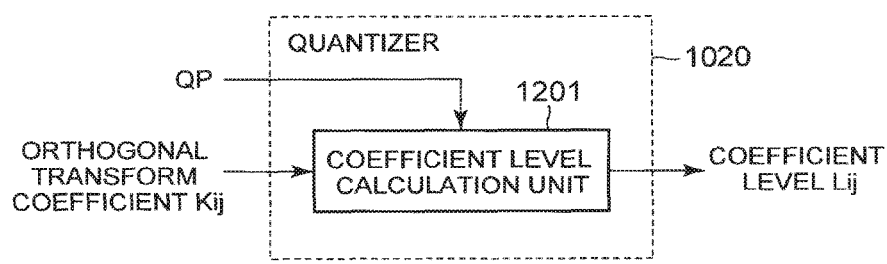
FIG. 15 It is a block diagram showing the structure of a typical adaptive quantizer.
Figure 16:
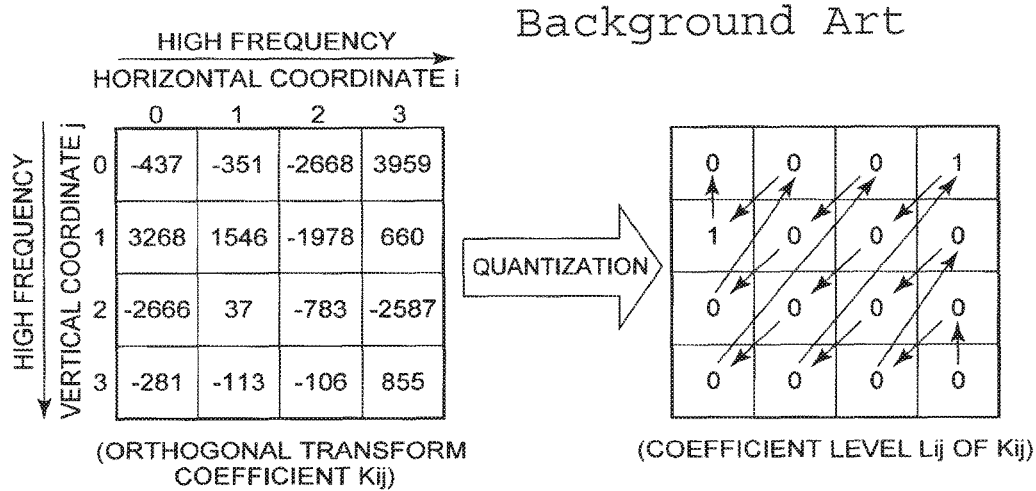
FIG. 16 It is an explanatory diagram showing an example of quantizing Kij using Qs having the value 4096 and a parameter f having the value ⅓.

FIG. 2 is a block diagram showing the structure of the adaptive quantizer 1021. The adaptive quantizer depicted in FIG. 2 includes a number of value information bits calculation unit ($R_{value}$ calculation unit) 1202, a number of position information bits calculation unit ($R_{position}$ calculation unit) 1203, a high-cost coefficient level detection/removal unit 1204, and a state variable update unit (StateFlag update unit) 1205 in addition to the coefficient level calculation unit 1201 in the quantizer depicted in FIG. 15. The coefficient level calculation unit 1201, the number of value information bits calculation unit ($R_{value}$ calculation unit) 1202, the number of position information bits calculation unit ($R_{position}$ calculation unit) 1203, and the high-cost coefficient level detection/removal unit 1204 are collectively called coefficient level determination unit 110.

The coefficient level calculation unit 1201 receives an orthogonal transform coefficient Kij and a quantization parameter QP and outputs a provisional coefficient level L'ij, using the foregoing Equation (1). For example, in the case of a 4×4 TU, the coefficient level calculation unit 1201 outputs L'ij (0≤i, j≤3) for each orthogonal transform coefficient Kij (0≤i, j≤3) in transmission order ((3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→(0, 1)→(0, 0)).

The $R_{value}$ calculation unit 1202 receives the provisional coefficient level L'ij, calculates a value information bit number $R_{value}$ which is the number of value information bits, and outputs it. $R_{value}$ is the number of bits of information indicating the value of L'ij. In detail, $R_{value}$ is calculated based on the number of bits of coeff_abs_level_greater1_flag which is information indicating whether or not the absolute value of the significant coefficient level is greater than 1, the number of bits of coeff_abs_level_greater2_flag which is information indicating whether or not the absolute value of the significant coefficient level is greater than 2, the number of bits of coeff_sign_flag which is information indicating the positive or negative sign of the significant coefficient level, the absolute value of the significant coefficient level to be processed, and the absolute value(s) of significant coefficient level(s) which precedes the coefficient level(s) just before the significant coefficient level to be processed. $R_{value}$ is the sum of the absolute value of the result of subtracting coeff_abs_level_greater1_flag and coeff_abs_level_greater2_flag from the absolute value of the significant coefficient level, and the number of bits of coeff_abs_level_remaining.

The StateFlag update unit 1205 monitors each coefficient level Lij output from the adaptive quantizer 1021, updates StateFlag, and outputs it. The StateFlag update unit 1205 initializes StateFlag to 0, each time a TU quantization process starts. StateFlag=0 indicates that the adaptive quantizer 1021 has not output a significant coefficient level Lij in the TU to be processed. When the adaptive quantizer 1021 outputs a significant coefficient level Lij for any orthogonal transform coefficient from beginning of the image block to the N-th (N≥2) prior to the target in transmission order in the TU to be processed, the StateFlag update unit 1205 updates StateFlag to 1. StateFlag=1 indicates that the adaptive quantizer 1021 has output a significant coefficient level Lij from beginning to the N-th prior to the target in transmission order in the TU to be processed. For example, in the case where N=4 and the orthogonal transform coefficient $K_{13}$ is to be processed, the StateFlag update unit 1205 updates StateFlag of $K_{13}$ using the coefficient levels $L_{33}$ and $L_{32}$ output from the adaptive quantizer 1021 from beginning to the N-th prior to the target. In other words, the preceding three coefficient levels $L_{23}$, $L_{31}$, and $L_{22}$ are not used when updating StateFlag.

The $R_{position}$ calculation unit 1203 receives the orthogonal transform coefficient position (i, j) and StateFlag, calculates a position information bit number $R_{position}$ which indicates the number of position information bits, and outputs it. $R_{position}$ indicates the number of position information bits indicating the positions of all significant coefficient levels of the TU on the frequency axis. In the case where StateFlag=0, the $R_{position}$ calculation unit 1203 determines that the significant coefficient level of the orthogonal transform coefficient to be processed is a significant coefficient level transmitted first, and calculates, as $R_{position}$, the sum of the numbers of bits of last_significant_x and last_significant_y which are information respectively indicating the horizontal position and vertical position of the significant coefficient level and the number of bits of siginificant_coeff_flag which is information indicating whether or not there is a significant coefficient level from the position following (last_significant_x, last_significant_y) to the position (0, 0). In the case where StateFlag=1, the calculation unit 1203 determines that the information indicating the positions of all significant coefficient levels of the TU on the frequency axis has already been transmitted, and determines 0 as $R_{position}$.

The high-cost coefficient level detection/removal unit 1204 receives L'ij, $R_{value}$, and $R_{position}$, and outputs the coefficient level Lij. In the case where $R_{position}$ is greater than $R_{value}$, the high-cost coefficient level detection/removal unit 1204 detects L'ij as a high-cost coefficient level, and outputs the value 0 as Lij. The high-cost coefficient level detection/removal unit 1204 thus suppresses the occurrence of the high-cost coefficient level. Otherwise, the high-cost coefficient level detection/removal unit 1204 outputs the provisional coefficient level L'ij as Lij.

The coefficient level determination unit 110 receives Kij, QP, and the orthogonal transform coefficient position (i, j), and outputs Lij.

Figure 3:
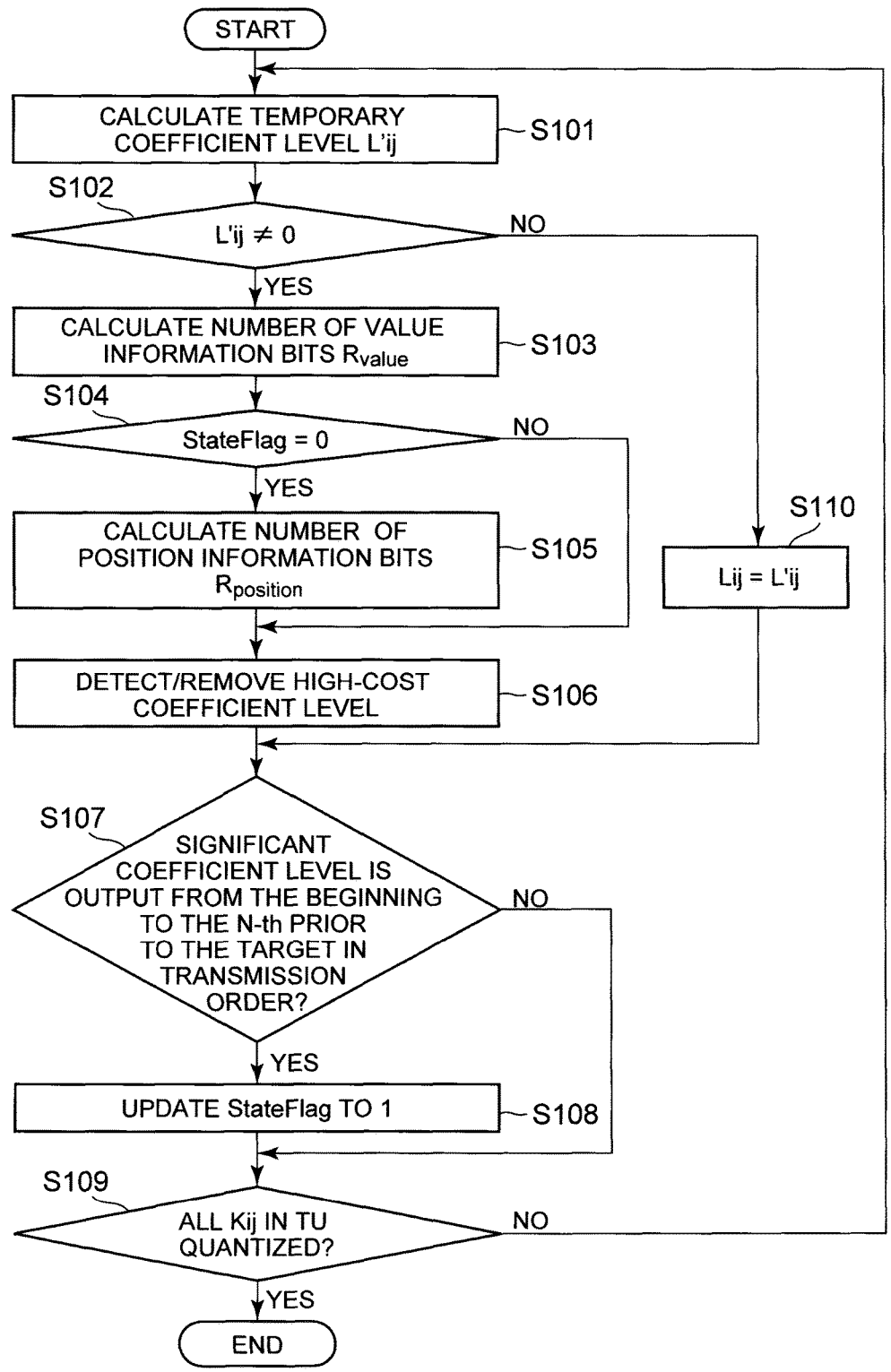
FIG. 3 It is a flowchart showing the operation of the adaptive quantizer.

The following describes the operation of the adaptive quantizer 1021 with reference to a flowchart in FIG. 3. For each TU, the adaptive quantizer 1021 performs the following operation on each orthogonal transform coefficient Kij (0≤i, j≤3) in the TU in transmission order (for example, in the case of a 4×4 TU, in the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→(0, 1)→(0, 0)).

In step S101, the coefficient level calculation unit 1201 receives the orthogonal transform coefficient Kij and the quantization parameter QP and outputs the provisional coefficient level L'ij, using the foregoing Equation (1).

In step S102, the coefficient level calculation unit 1201 determines whether or not the value of L'ij is not 0. In the case where the value of L'ij is not 0, the operation proceeds to step S103. In the case where the value of L'ij is 0, the coefficient level calculation unit 1201 sets Lij=L'ij (step S110). The operation then proceeds to step S107.

In step S103, the $R_{value}$ calculation unit 1202 receives the provisional coefficient level L'ij, and calculates $R_{value}$ which indicates the number of value information bits of L'ij. The operation then proceeds to step S104.

In step S104, the $R_{position}$ calculation unit 1203 determines whether or not StateFlag=0. In the case where StateFlag=0, the operation proceeds to step S105. In the case where StateFlag=1, the $R_{position}$ calculation unit 1203 sets the value of $R_{position}$ to 0. The operation then proceeds to step S106.

In step S105, the $R_{position}$ calculation unit 1203 receives the orthogonal transform coefficient position (i, j) and StateFlag, and calculates $R_{position}$ which indicates the number of position information bits. The operation then proceeds to step S106.

In step S106, the high-cost coefficient level detection/removal unit 1204 receives L'ij, $R_{value}$, and $R_{position}$, and outputs the coefficient level Lij. In the case where $R_{position}$ is greater than $R_{value}$, the high-cost coefficient level detection/removal unit 1204 detects L'ij as a high-cost coefficient level, and outputs the value 0 as Lij. The high-cost coefficient level detection/removal unit 1204 thus suppresses the occurrence of the high-cost coefficient level. Otherwise, the high-cost coefficient level detection/removal unit 1204 outputs the provisional coefficient level L'ij as Lij. The operation then proceeds to step S107.

In step S107, the state variable update unit 1205 determines whether or not a significant coefficient level has been output from the beginning to the N-th (N≥2) prior to the target in transmission order in the TU to be processed. The part that performs quantization in the adaptive quantizer 1021 outputs the coefficient level. In the case where one or more significant coefficient levels have been output, the operation proceeds to step S108. Otherwise, the operation proceeds to step S109.

In step S108, the StateFlag update unit 1205 updates StateFlag to 1. The operation then proceeds to step S109.

In step S109, the adaptive quantizer 1021 determines whether or not all orthogonal transform coefficients included in the TU have been quantized. In the case where all orthogonal transform coefficients have been quantized, the quantization process for the TU ends. Otherwise, the operation proceeds to step S101 to quantize the next orthogonal transform coefficient.

The video coding device in this exemplary embodiment using the adaptive quantizer 1021 described above can prevent the occurrence of the high-cost coefficient level, by determining the coefficient level of the orthogonal transform coefficient (detecting/removing the high-cost coefficient level) in consideration of the number of value information bits and the number of position information bits. The adaptive quantizer 1021 can detect and remove high-cost coefficient levels simultaneously on N (≥2) successive provisional coefficient levels, by calculating the number of position information bits of each significant coefficient level using coefficient levels from beginning of the TU to the N-th (N≥2) prior to the target in transmission order. The video coding device in this exemplary embodiment thus achieves both prevention of a decrease in compression efficiency and parallel quantization of a plurality of orthogonal transform coefficients, by simultaneously determining a plurality of coefficient levels successive in transmission order in consideration of the number of value information bits and the number of position information bits.

Figure 4:
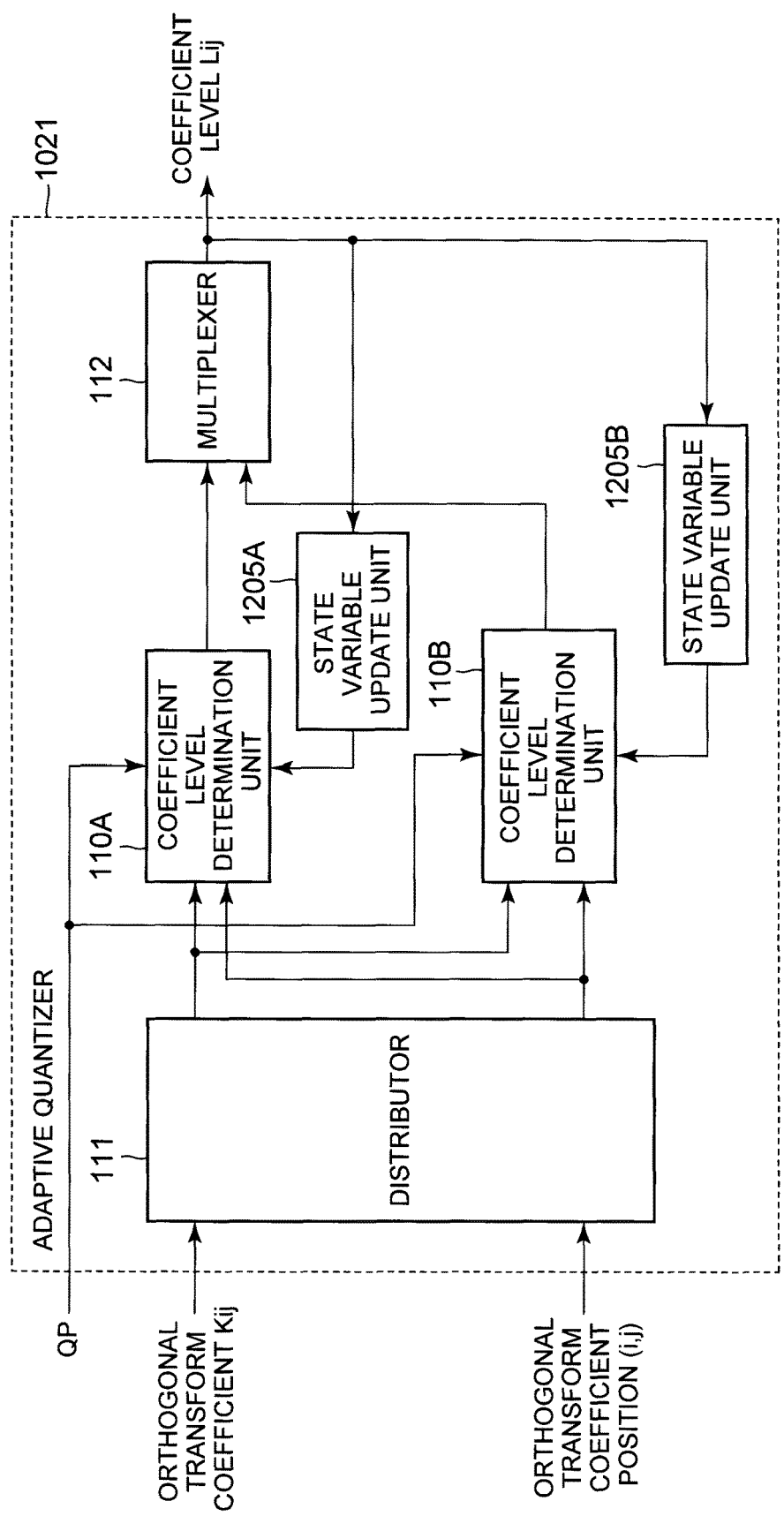
FIG. 4 It is a block diagram showing the parallelization structure of the adaptive quantizer in Exemplary Embodiment 1.

FIG. 4 is a block diagram showing an example of the structure of the adaptive quantizer 1021 that processes in parallel orthogonal transform coefficients Kij successive in transmission order. The adaptive quantizer 1021 depicted in FIG. 4 includes two coefficient level determination units 110A and 110B, two state variable update units (StateFlag update units) 1205A and 1205B, a distributor 111, and a multiplexer 112.

The operation of the adaptive quantizer 1021 for a 4×4 TU is described below.

The distributor 111 receives two orthogonal transform coefficients Kij successive in transmission order and their orthogonal transform coefficient positions (i, j), and distributes the respective orthogonal transform coefficients Kij and orthogonal transform coefficient positions (i, j) to the coefficient level determination units 110A and 110B which follow the distributor 111. In detail, when receiving $K_{33}$ and $K_{32}$ successive in transmission order and their orthogonal transform coefficient positions (3, 3) and (3, 2), the distributor 111 outputs $K_{33}$ and (3, 3) to the coefficient level determination unit 110A and outputs $K_{32}$ and (3, 2) to the coefficient level determination unit 110B (the output destinations may be reversed). The distributor 111 performs this distributing process on all orthogonal transform coefficients in the TU in transmission order.

The coefficient level determination units 110A and 110B operate in the same way as the coefficient level determination unit 110. The state variable update units (StateFlag update units) 1205A and 1205B operate in the same way as the state variable update unit (StateFlag update unit) 1205.

The multiplexer 112 receives coefficient levels Lij output from the two coefficient level determination units 110A and 110B, and outputs the two coefficient levels after sorting them in transmission order. In detail, the multiplexer 112 receives $L_{33}$ and $L_{32}$ output from the two coefficient level determination units 110A and 110B, sorts them in transmission order, and outputs $L_{33}$ and $L_{32}$ in this order. The multiplexer 112 performs this process on all orthogonal transform coefficients in the TU in transmission order.

Exemplary Embodiment 2

Figure 5:
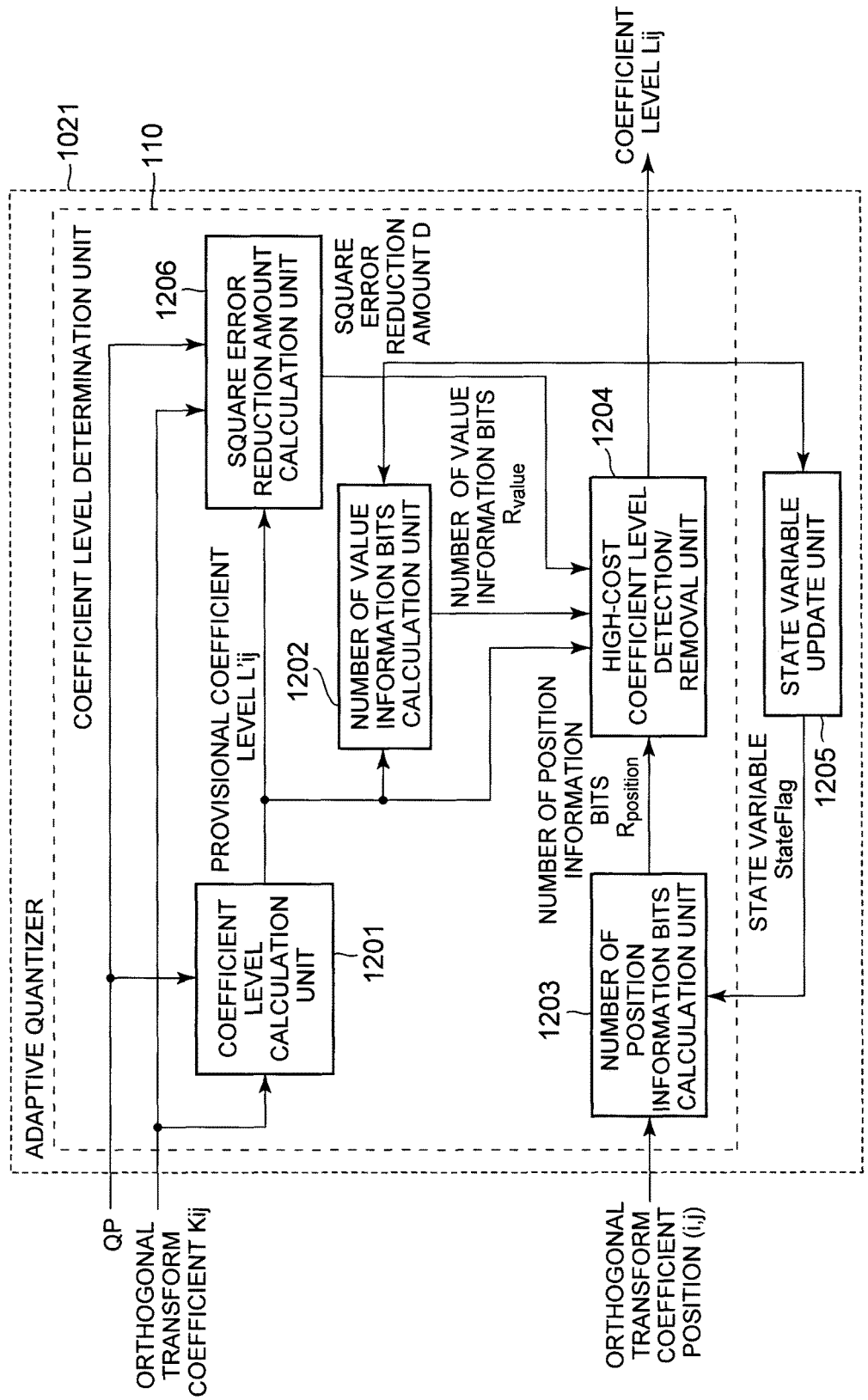
FIG. 5 It is a block diagram showing the structure of an adaptive quantizer in Exemplary Embodiment 2.

FIG. 5 is a block diagram showing Exemplary Embodiment 2 of a video coding device according to the present invention. The video coding device in Exemplary Embodiment 2 uses the number of value information bits, the number of position information bits, and the amount of square error reduction, when detecting a high-cost coefficient level.

In the video coding device depicted in FIG. 5, a square error reduction amount calculation unit (D calculation unit) 1206 is additionally included in the adaptive quantizer 1021, as compared with Exemplary Embodiment 1. In detail, the square error reduction amount calculation unit 1206 is added to the coefficient level determination unit 110. Moreover, in Exemplary Embodiment 2, the high-cost coefficient level detection/removal unit 1204 in the adaptive quantizer 1021 receives L'ij, $R_{value}$, $R_{position}$, and a square error reduction amount D, and outputs a coefficient level Lij.

The square error reduction amount calculation unit 1206 and the high-cost coefficient level detection/removal unit 1204 are described below.

The square error reduction amount calculation unit 1206 receives the orthogonal transform coefficient Kij, the quantization parameter QP, and L'ij, and outputs the square error reduction amount D. The square error reduction amount D is the amount of square error reduction for Kij. In this exemplary embodiment, the square error reduction amount calculation unit 1206 calculates D using Kij, Qs, and L'ij, as shown in the following Equation (3).

$$D=(Kij-0)^2-(Kij-Qs\cdot L'ij)^2=2\cdot Kij\cdot Qs\cdot L'ij-Qs^2\cdot L'ij^2 \quad (3)$$

The high-cost coefficient level detection/removal unit 1204 receives L'ij, $R_{value}$, $R_{position}$, and D, and outputs the coefficient level Lij. In the case where the product of the sum of $R_{value}$ and $R_{position}$ and λ is greater than or equal to the square error reduction amount D, the high-cost coefficient level detection/removal unit 1204 determines L'ij as a high-cost coefficient level, and outputs the value 0 as Lij. In the case where L'ij is not a high-cost coefficient level, the high-cost coefficient level detection/removal unit 1204 outputs L'ij as Lij. Here, λ is the gradient of the relationship between the amount of square error reduction and the amount of transmission code. λ is dependent on the quantization parameter QP in such a manner that λ is smaller when the quantization parameter is smaller (the quantization step size is smaller) and larger when the quantization parameter is larger (the quantization step size is larger). In the case of uniform quantization, λ is represented by the following Equation (4) using Qs.

$$\lambda = \frac{\ln 2}{6} \cdot Qs^2 \quad (4)$$

Figure 6:
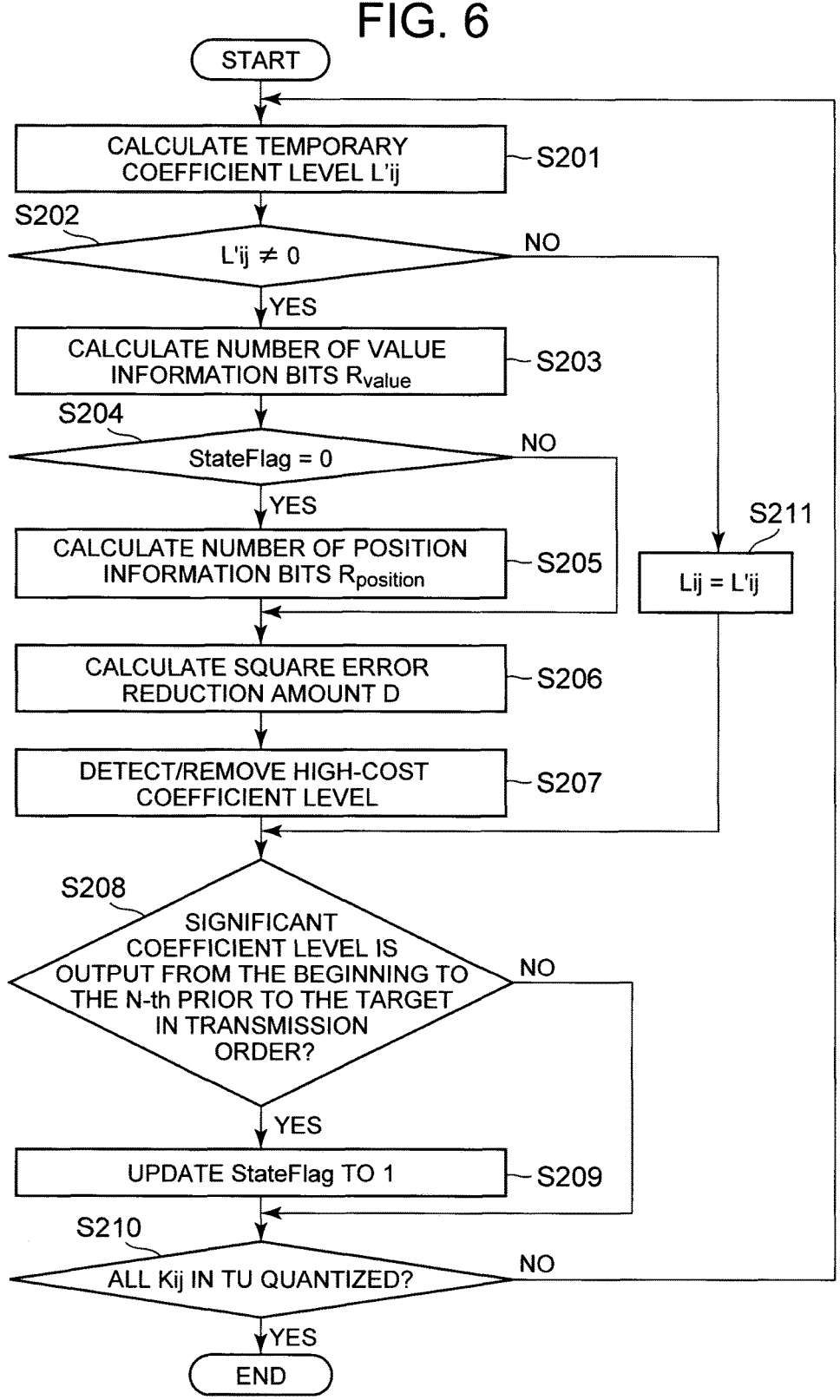
FIG. 6 It is a flowchart showing the operation of the adaptive quantizer.

The following describes the operation of the adaptive quantizer in this exemplary embodiment, with reference to a flowchart in FIG. 6.

For each TU, the adaptive quantizer 1021 performs the following operation on each orthogonal transform coefficient Kij (0≤i, j≤3) in the TU in transmission order (for example, in the case of a 4×4 TU, in the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→(0, 1)→(0, 0)).

In step S201, the coefficient level calculation unit 1201 receives the orthogonal transform coefficient Kij and the quantization parameter QP and outputs the provisional coefficient level L'ij, using the foregoing Equation (1).

In step S202, the coefficient level calculation unit 1201 determines whether or not the value of L'ij is not 0. In the case where the value of L'ij is not 0, the operation proceeds to step S203. In the case where the value of L'ij is 0, the coefficient level calculation unit 1201 sets Lij=L'ij (step S211). The operation then proceeds to step S208.

In step S203, the $R_{value}$ calculation unit 1202 receives the provisional coefficient level L'ij, and calculates $R_{value}$ which indicates the number of value information bits of L'ij. The operation then proceeds to step S204.

In step S204, the $R_{position}$ calculation unit 1203 determines whether or not StateFlag=0. In the case where StateFlag=0, the operation proceeds to step S205. In the case where StateFlag=1, the $R_{position}$ calculation unit 1203 sets the value of $R_{position}$ to 0. The operation then proceeds to step S206.

In step S205, the $R_{position}$ calculation unit 1203 receives the orthogonal transform coefficient position (i, j) and StateFlag, and calculates $R_{position}$ which indicates the number of position information bits. The operation then proceeds to step S206.

In step S206, the square error reduction amount calculation unit 1206 calculates D which is the amount of square error reduction for the orthogonal transform coefficient. The operation then proceeds to step S207.

In step S207, in the case where the product of the sum of $R_{position}$ and $R_{value}$ and X is greater than or equal to D, the high-cost coefficient level detection/removal unit 1204 determines L'ij as a high-cost coefficient level, and outputs the value 0 as Lij. In the case where L'ij is not a high-cost coefficient level, the high-cost coefficient level detection/removal unit 1204 outputs L'ij as Lij. The operation then proceeds to step S208.

In step S208, the state variable update unit 1205 determines whether or not a significant coefficient level has been output from the beginning to the N-th (N≥2) prior to the target in transmission order in the TU to be processed. In the case where one or more significant coefficient levels have been output, the operation proceeds to step S209. Otherwise, the operation proceeds to step S210.

In step S209, the StateFlag update unit 1205 updates StateFlag to 1. The operation then proceeds to step S210.

In step S210, the adaptive quantizer 1021 determines whether or not all orthogonal transform coefficients included in the TU have been quantized. In the case where all orthogonal transform coefficients have been quantized, the quantization process for the TU ends. Otherwise, the operation proceeds to step S201 to quantize the next orthogonal transform coefficient.

In each of the exemplary embodiments described above, all significant provisional coefficient levels are subjected to the high-cost coefficient level detection/removal. Alternatively, not all significant provisional coefficient levels but only significant provisional coefficient levels having small values (e.g. 1 or 2 in absolute value) may be subjected to the high-cost coefficient level detection/removal. This is because significant coefficient levels having small values tend to be high-cost coefficient levels. By subjecting significant provisional coefficient levels having small values to the high-cost coefficient level detection/removal, it is possible to suppress image degradation caused by, for example, wrongly setting a coefficient level having a large value to 0. Moreover, in the case of realizing the video coding process by software, the number of times the high-cost coefficient level detection/removal is applied is reduced statistically, which contributes to a shorter quantization process time.

In each of the exemplary embodiments described above, all significant provisional coefficient levels in the TU are subjected to the high-cost coefficient level detection/removal. Alternatively, the remaining significant provisional coefficient levels in the TU may be subjected to the high-cost coefficient level detection/removal in the case where the absolute sum of the differences between the already processed provisional coefficient levels and the corresponding coefficient levels in the TU is less than or equal to a predetermined threshold. In this way, it is possible to suppress image degradation caused by, for example, wrongly setting many significant coefficient levels having small values to 0. Moreover, in the case of realizing the video coding process by software, the number of times the high-cost coefficient level detection/removal is applied is reduced statistically, which contributes to a shorter quantization process time. Note that the absolute sum is easily calculated by the high-cost coefficient level detection/removal unit.

In each of the exemplary embodiments described above, information of whether or not the quantizer has output a significant coefficient level from the beginning to the N-th (N≥2) prior to the processing target in transmission order is used in the high-cost coefficient level detection/removal. Such high-cost coefficient level detection/removal is equivalent to high-cost coefficient level detection/removal using information in which the values of (N−1) coefficient levels immediately preceding the processing target are 0.

Each of the exemplary embodiments described above may be realized by hardware, but may also be realized by a computer program.

Figure 7:
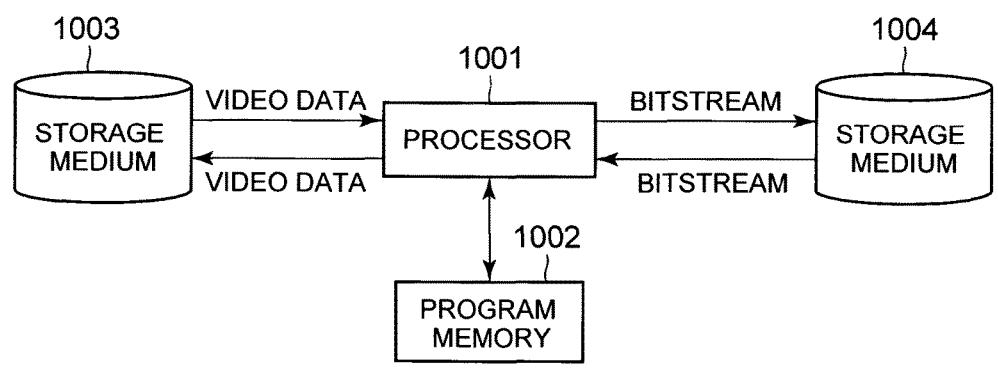
FIG. 7 It is a block diagram showing an example of an information processing system using a program.

An information processing system depicted in FIG. 7 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk is available as such a storage medium.

In the information processing system depicted in FIG. 7, a program for realizing the functions of the blocks depicted in FIG. 1 is stored in the program memory 1002. The processor 1001 realizes the functions of the video coding device depicted in FIG. 1, by executing the processes according to the program stored in the program memory 1002.

Figure 8:
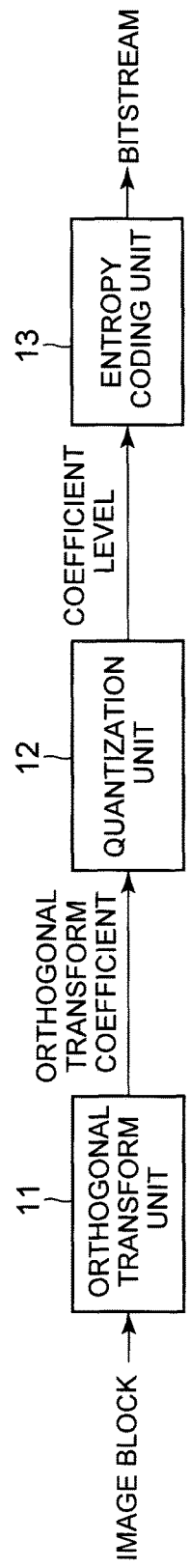
FIG. 8 It is a block diagram showing main parts of a video coding device according to the present invention.
Figure 9:
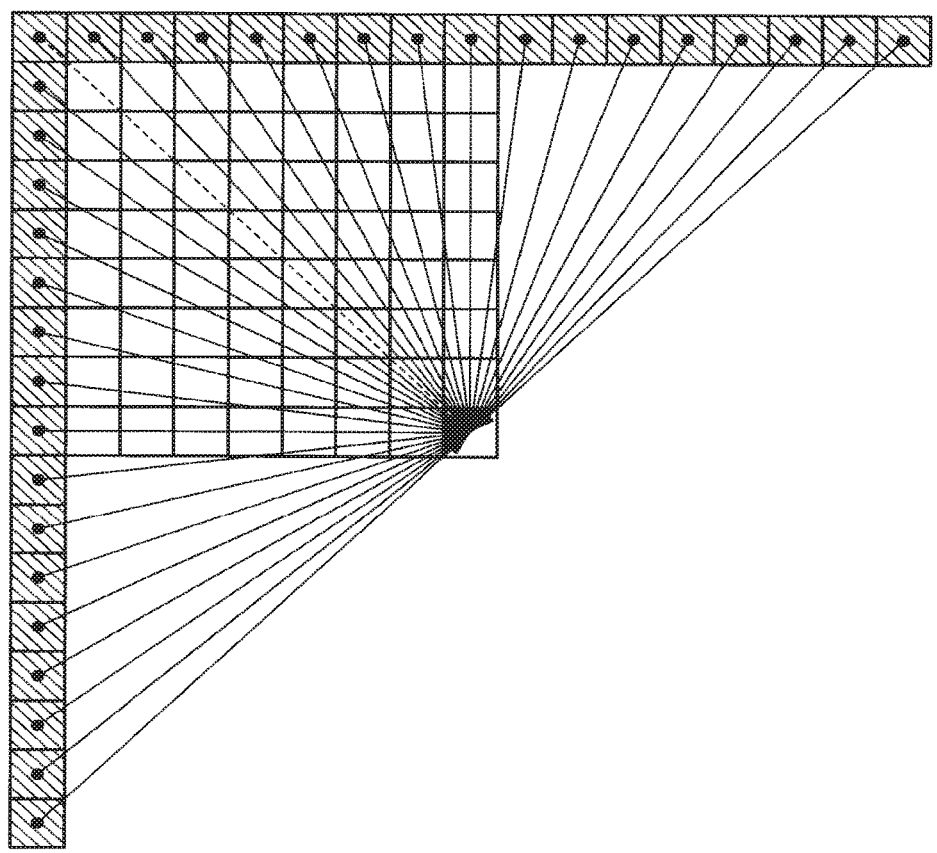
FIG. 9 It is an explanatory diagram showing an example of 33 types of angular intra prediction.
Figure 10:
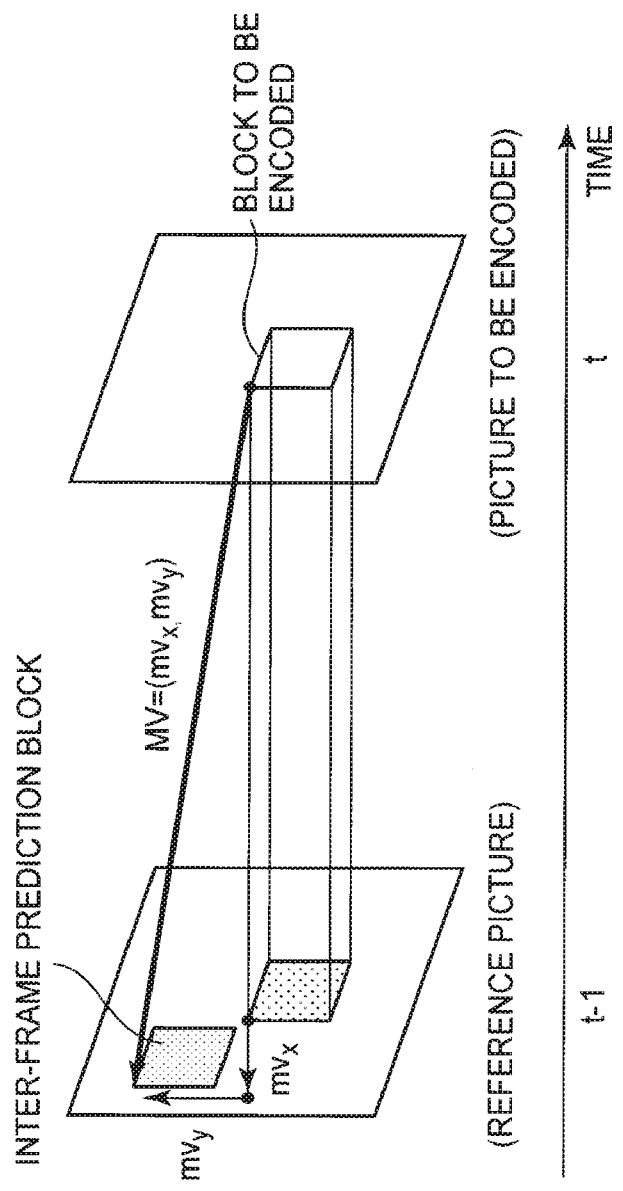
FIG. 10 It is an explanatory diagram showing an example of inter-frame prediction.

FIG. 8 is a block diagram showing main parts of a video coding device according to the present invention. As depicted in FIG. 8, the video coding device according to the present invention includes an orthogonal transform unit 11 for orthogonally transforming an image block to calculate orthogonal transform coefficients, a quantization unit 12 for quantizing the orthogonal transform coefficients to calculate coefficient levels, and an entropy encoding unit 13 for entropy-encoding position information of all significant coefficient levels from among the coefficient levels and then entropy-encoding value information of each of the significant coefficient levels, to output a bitstream, wherein the quantization unit 12 includes a number of value information bits calculation unit for calculating the number of value information bits of a significant coefficient level of an orthogonal transform coefficient to be processed in the image block, a state variable update unit for monitoring coefficient levels output from the quantization unit in the image block from beginning to the N-th prior to the target in transmission order, and updating a state variable indicating whether or not at least one of monitored coefficient levels is significant, a number of position information bits calculation unit for calculating the number of position information bits of the significant coefficient level of the orthogonal transform coefficient to be processed, based on a position of the orthogonal transform coefficient to be processed and the state variable, and a high-cost coefficient level detection/removal unit for setting the significant coefficient level to 0 in the case where the number of value information bits and the number of position information bits satisfy a predetermined condition.

The foregoing exemplary embodiments may be partly or wholly described in the following supplementary notes, though the structure of the present invention is not limited to such.

(Supplementary note 1) A video coding device including orthogonal transform means for orthogonally transforming an image block to calculate orthogonal transform coefficients, quantization means for quantizing the orthogonal transform coefficients to calculate coefficient levels, and entropy coding means for entropy-encoding position information of all significant coefficient levels from among the coefficient levels and then entropy-encoding value information of each of the significant coefficient levels, to output a bitstream, wherein the quantization means includes number of value information bits calculation means for calculating the number of value information bits of a significant coefficient level of an orthogonal transform coefficient to be processed in the image block, state variable update means for monitoring coefficient levels output from the quantization means in the image block from beginning to the N-th prior to the target in transmission order, and updating a state variable indicating whether or not at least one of monitored coefficient levels is significant, a number of position information bits calculation means for calculating the number of position information bits of the significant coefficient level of the orthogonal transform coefficient to be processed, based on a position of the orthogonal transform coefficient to be processed and the state variable, and high-cost coefficient level detection/removal means for setting the significant coefficient level to 0 in the case where the number of value information bits and the number of position information bits satisfy a predetermined condition.

(Supplementary note 2) A video coding device including orthogonal transform means for orthogonally transforming an image block to calculate orthogonal transform coefficients, quantization means for quantizing the orthogonal transform coefficients to calculate coefficient levels, and entropy coding means for entropy-encoding position information of all significant coefficient levels from among the coefficient levels and then entropy-encoding value information of each of the significant coefficient levels, to output a bitstream, wherein the quantization means includes number of value information bits calculation means for calculating the number of value information bits of a significant coefficient level of an orthogonal transform coefficient to be processed in the image block, state variable update means for monitoring coefficient levels output from the quantization means in the image block from beginning to a coefficient level immediately before the coefficient level to be processed in transmission order, and updating a state variable indicating whether or not at least one of monitored coefficient levels other than immediately preceding (N−1) coefficient levels is significant; number of position information bits calculation means for calculating the number of position information bits of the significant coefficient level of the orthogonal transform coefficient to be processed, based on a position of the orthogonal transform coefficient to be processed and the state variable; and high-cost coefficient level detection/removal means for setting the significant coefficient level to 0 in the case where the number of value information bits and the number of position information bits satisfy a predetermined condition.

(Supplementary note 3) The video coding device according to supplementary note 1 or 2, wherein the high-cost coefficient level detection/removal means sets the significant coefficient level to 0 in the case where the number of position information bits is greater than the number of value information bits.

(Supplementary note 4) The video coding device according to supplementary note 1 or 2, wherein the quantization means includes square error reduction amount calculation means for calculating an amount of square error reduction for the orthogonal transform coefficient, using a quantization parameter, the significant coefficient level, and the orthogonal transform coefficient, and wherein the high-cost coefficient level detection/removal means sets the significant coefficient level to 0 in the case where the amount of square error reduction is less than or equal to a value obtained by multiplying a sum of the number of position information bits and the number of value information bits by a predetermined multiplier, using the number of position information bits, the number of value information bits, and the amount of square error reduction.

Although the present invention has been described with reference to the foregoing exemplary embodiments and examples, the present invention is not limited to the foregoing exemplary embodiments and examples. Various changes understandable by those skilled in the art within the scope of the present invention can be made to the structures and details of the present invention.

REFERENCE SIGNS LIST 11 orthogonal transform unit
12 quantization unit
13 entropy coding unit
101 transformer
1021 adaptive quantizer
103 entropy encoder
104 inverse transformer/inverse quantizer
105 buffer
106 predictor
107 estimator
110, 110A, 110B coefficient level determination unit
1001 processor
1002 program memory
1003 storage medium
1004 storage medium
1020 quantizer
1201 coefficient level calculation unit
1202 number of value information bits calculation unit (Rvalue calculation unit)
1203 number of position information bits calculation unit (Rposition calculation unit)
1204 high-cost coefficient level detection/removal unit
1205, 1205A,1205B state variable update unit (StateFlag update unit)
1206 square error reduction amount calculation unit (D calculation unit)

What is claimed is:

1. A video coding device comprising:
a memory storing a software component; and
at least one processor configured to execute the software component to perform:
orthogonally transforming an image block to calculate orthogonal transform coefficients;
quantizing the orthogonal transform coefficients to calculate a coefficient level; and
entropy encoding position information on all significant coefficient levels from among the coefficient levels and then entropy-encoding value information on each of the significant coefficient levels, to output a bitstream,
wherein the processor is further configured to perform, when quantizing:
calculating number of value information bits of the significant coefficient level of the orthogonal transform coefficient to be processed in the image block;
monitoring coefficient levels output from beginning to N-th prior to target in transmission order, and updating a state variable indicating whether or not at least one of monitored coefficient levels is significant;
calculating number of position information bits of the significant coefficient level of the orthogonal transform coefficient to be processed, wherein the calculating uses a position of the orthogonal transform coefficient to be processed and the state variable; and
setting the significant coefficient level to 0 when the number of value information bits and the number of position information bits satisfy a predetermined condition,
wherein the predetermined condition is the number of position information bits is greater than the number of value information bits.

2. The video coding device according to claim 1, wherein the processor is further configured to perform:
when quantizing, calculating an amount of square error reduction for the orthogonal transform coefficient, using a quantization parameter, the significant coefficient level, and the orthogonal transform coefficient, and
setting the significant coefficient level to 0 when the amount of square error reduction is less than or equal to a value obtained by multiplying a sum of the number of position information bits and the number of value information bits by a predetermined multiplier,
wherein the predetermined multiplier is dependent on the quantization parameter.

3. A video coding method, implemented by a processor, comprising:
orthogonally transforming an image block to calculate an orthogonal transform coefficient;
quantizing the orthogonal transform coefficient to calculate a coefficient levels and
entropy-encoding position information of all significant coefficient levels from among the coefficient levels and then entropy-encoding value information of each of the significant coefficient levels, to output a bitstream,
wherein when calculating the coefficient levels,
number of value information bits of a significant coefficient level of the orthogonal transform coefficient to be processed in the image block is calculated;
a state variable indicating whether at least one of coefficient levels in the image block from beginning to N-th prior to target in transmission order is significant or not is updated;
number of position information bits of the significant coefficient level of the orthogonal transform coefficient to be processed is calculated, where the calculating uses a position of the orthogonal transform coefficient to be processed and the state variable; and
the significant coefficient level is set to 0 when the number of value information bits and the number of position information bits satisfy a predetermined condition,
wherein the predetermined condition is the number of position information bits is greater than the number of value information bits.

4. The video coding method according to claim 3, wherein when calculating the coefficient levels, an amount of square error reduction for the orthogonal transform coefficient is calculated using a quantization parameter, the significant coefficient level, and the orthogonal transform coefficient, and
wherein the significant coefficient level is set to 0 when the amount of square error reduction is less than or equal to a value obtained by multiplying a sum of the number of position information bits and the number of value information bits by a predetermined multiplier,
wherein the predetermined multiplier is dependent on the quantization parameter.

5. A non-transitory computer readable information recording medium storing a video coding program for causing a computer to execute when executed by a processor, performs:
orthogonally transforming an image block to calculate an orthogonal transform coefficient;
quantizing the orthogonal transform coefficient to calculate a coefficient level; and
entropy-encoding position information of all significant coefficient levels from among the coefficient levels and then entropy-encoding value information of each of the significant coefficient levels, to output a bitstream,
when calculating the coefficient level:
calculating number of value information bits of the significant coefficient level of the orthogonal transform coefficient to be processed in the image block;
updating a state variable indicating whether or not at least one of the coefficient levels in the image block from beginning to N-th prior to target in transmission order is significant;
calculating number of position information bits of the significant coefficient level of the orthogonal transform coefficient to be processed, wherein the calculating uses a position of the orthogonal transform coefficient to be processed and the state variable; and
setting the significant coefficient level to 0 when the number of value information bits and the number of position information bits satisfy a predetermined condition,
wherein the predetermined condition is the number of position information bits is greater than the number of value information bits.

6. The non-transitory computer readable information recording medium according to claim 5, when calculating the coefficient levels, calculating an amount of square error reduction for the orthogonal transform coefficient, using a quantization parameter, the significant coefficient level, and the orthogonal transform coefficient, and
setting the significant coefficient level to 0 when the amount of square error reduction is less than or equal to a value obtained by multiplying a sum of the number of position information bits and the number of value information bits by a predetermined multiplier,
wherein the predetermined multiplier is dependent on the quantization parameter.

* * * * *